United States Patent [19]

Hamada

[11] Patent Number: 4,617,641
[45] Date of Patent: Oct. 14, 1986

[54] OPERATION UNIT FOR FLOATING POINT DATA HAVING A VARIABLE LENGTH EXPONENT PART

[75] Inventor: Hozumi Hamada, Chofu, Japan
[73] Assignee: Hitachi, Ltd., Tokyo, Japan
[21] Appl. No.: 543,426
[22] Filed: Oct. 19, 1983
[51] Int. Cl.[4] .......................... G06F 7/48; G06F 5/00
[52] U.S. Cl. .................................... 364/748; 235/310
[58] Field of Search ...................... 364/748; 235/310; 340/347 DD

[56] References Cited

U.S. PATENT DOCUMENTS 3,742,198  6/1973  Morris ................................ 235/310

OTHER PUBLICATIONS

Hamada, "Internal Representations for Numeric Data", *Comm. of Infor. Processing Society of Japan*, vol. 24, No. 4, Apr. 1983, pp. 353-357.
Morris, "Tapered Fl. Pt.: A New Fl. Pt. Represention", *IEEE Trans. on Computers*, Dec. 1971.
Matsui et al., "An Overflow/Underflow Free Fl. Pt. Representation of Nos.", *J. of Infor. Processing*, vol. 4, No. 3, 1981, pp. 123-133.
Hamada, "Universal Representation of Real Numbers in Digital EKG", *Bit*, vol. 14, No. 4, Mar. 1982, pp. 53-59.
Hamada, "Not-a-number on New Representation of Real Nos. & Relations Between the Representation & Programming Language, *Proc. of the 25th Conf. of Infor. Processing Society of Japan*, IL-9, Oct. 1982, pp. 1169-1170.
Hamada, "Data Length Independent Real No. Representation Based of Double Exponential Cut II, *J. of Infor. Processing Society of Japan*, vol. 24, No. 2, Mar. 1983, pp. 149-156.
Hamada, "A Representation of Real Numbers Instead of Fl. Pt. Representation", *Proc. of the 23rd Conf. of Infor. Processing Society of Japan*, (7E-7), Oct. 1981, pp. 151-152.
Hamada, "Data Length Independent Real No. Representation Based on Double Exponential Cut", *J. of Infor. Processing Society of Japan*, vol. 22, No. 6, Nov. 1981, pp. 521-526.
Hamada, "Representation of Real Nos. Instead of Fl. Pt. Representation", *Proc. of Symposium in Research Institute of Mathematical Science of University of Kyoto*, Nov. 1981.

*Primary Examiner*—David H. Malzahn
*Attorney, Agent, or Firm*—Antonelli, Terry & Wands

[57] ABSTRACT

A floating-point number operating unit utilizes a floating-point representation comprising a variable exponent part and a variable mantissa part and having a fixed length as a whole. The exponent part comprises a first bit string having the value corresponding to the exponent and a bit string comprising 1s or 0s having the length depending on the length of the first bit string; the latter bit string comprises 1s or 0s depending on a combination of the sign of the numerical value and the sign of the exponent. Moreover, the mantissa part has the length obtained by subtracting the length (one bit) of the sign bit and that of the exponent part from the fixed length. The floating-point number operating unit is provided with a first circuit for creating the exponent and mantissa parts in the fixed-length representation from a floating-point number expressed according to the floating-point representation explained above, a second circuit for performing a floating-point number operation based on the exponent and mantissa parts expressed according to the fixed-length representation, and a third circuit for creating a variable-length exponent part and a variable-length mantissa part from the result of the floating-point number operation.

15 Claims, 14 Drawing Figures

FIG. 3

| VALUE | SIGN BIT PART | EXPONENT PART | MANTISSA PART |
|---|---|---|---|
| −7 | 1 | 001 | 0010 |
| −6 | 1 | 001 | 0100 |
| −5 | 1 | 001 | 0110 |
| −4 | 1 | 001 | 1000 |
| −3 | 1 | 001 | 1100 |
| −2 | 1 | 010 | 0000 |
| −1 | 1 | 100 | 0000 |
| 0 | 0 | 000 | 0000 |
| 1 | 0 | 100 | 0000 |
| 2 | 0 | 110 | 0000 |
| 3 | 0 | 110 | 0100 |
| 4 | 0 | 110 | 1000 |
| 5 | 0 | 110 | 1010 |
| 6 | 0 | 110 | 1100 |
| 7 | 0 | 110 | 1110 |

FIG. 9

| VALUE | SIGN BIT | EXPONENT PART | MANTISSA PART |
|---|---|---|---|
| −7 | 1 | 0001 | 1010 |
| −6 | 1 | 0001 | 1100 |
| −5 | 1 | 0001 | 1110 |
| −4 | 1 | 0010 | 0000 |
| −3 | 1 | 0011 | 0000 |
| −2 | 1 | 0100 | 0000 |
| −1 | 1 | 1000 | 0000 |
| 0 | 0 | 0000 | 0000 |
| 1 | 0 | 1000 | 0000 |
| 2 | 0 | 1100 | 0000 |
| 3 | 0 | 1101 | 0000 |
| 4 | 0 | 1110 | 0000 |
| 5 | 0 | 1110 | 0010 |
| 6 | 0 | 1110 | 0100 |
| 7 | 0 | 1110 | 0110 |

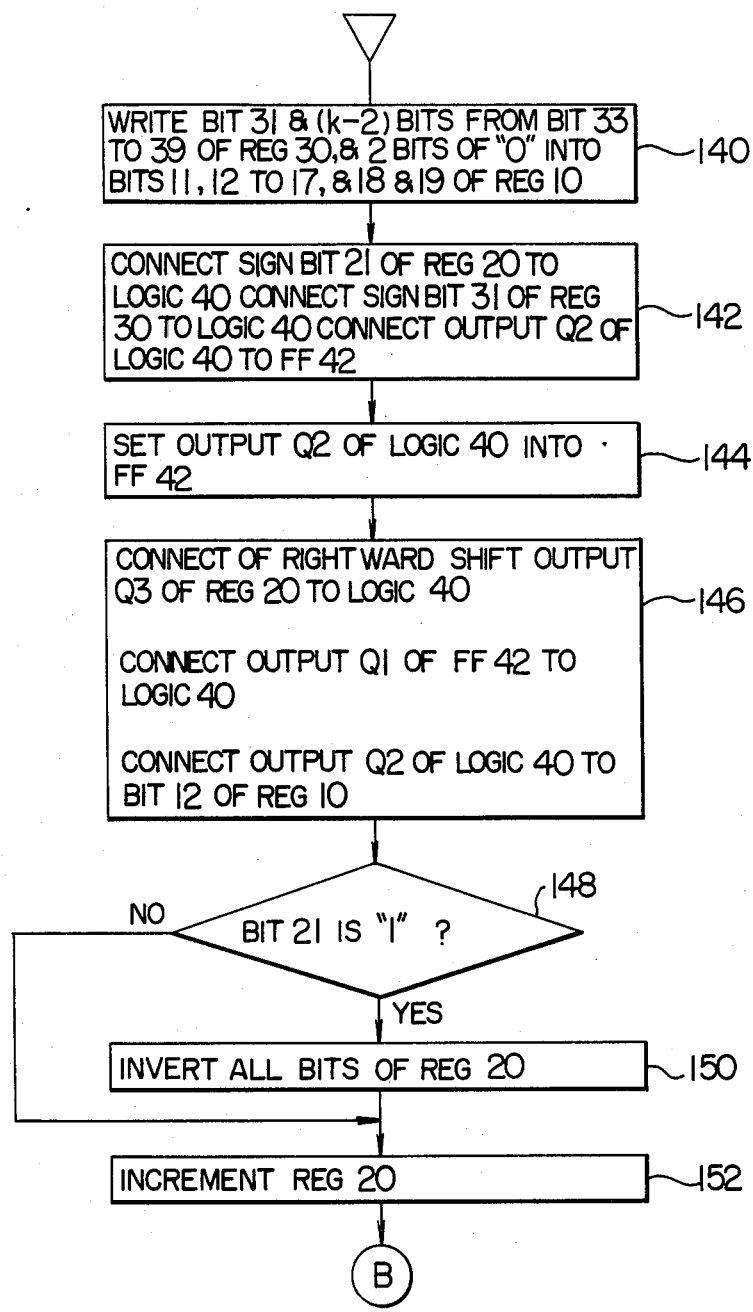

OPERATION UNIT FOR FLOATING POINT DATA HAVING A VARIABLE LENGTH EXPONENT PART

BACKGROUND OF THE INVENTION

The present invention relates to a floating-point data operating unit, perticularly to a unit for operating on a floating-point number expressed in a floating-point representation having a variable-length exponent part.

A floating-point representation is a number system often used for a scientific calculation because it makes it possible to manipulate large numbers as well as small numbers with a high precision.

FIG. 1 illustrates a typical example of data expressed in the conventional floating-point representation.

According to FIG. 1, reference numeral 1 indicates a bit representing the sign information of a numerical value i.e. the sign information of a mantissa, reference numeral 2 indicates a bit representing the sign information of an exponent, and reference numeral 4 indicates the absolute value information of the exponent; portions indicated by reference numerals 2 and 4 are collectively referred to as an exponent part. Reference numeral 5 indicates the mantissa part and reference numeral 6 represents the boundary between the exponent part and the mantissa part.

In the conventional floating-point representation, the boundary 6 between the exponent and mantissa parts is fixed, thus the number of bits for representing the exponent is constant, which leads to a drawback that the range of values that can be represented is limited. Furthermore, even if there are unused bits because the value of the exponent part is small, such free bits cannot be used for other purposes. This means that the conventional floating-point representation is not flexible enough, for example, to utilize the unused space of the exponent part to improve the precision of the mantissa part.

SUMMARY OF THE INVENTION

An object of the present invention is to provide a unit for operating on data in a flexible floating-point representation by solving above-mentioned problem of the conventional floating-point representation and by introducing a variable-length exponent part wherein a value in the vicinity of one is expressed with a high precision and an extremely great or small value can also be presented as well.

To achieve this object, a floating-point data operating unit according to the present invention utilizes a floating-point representation comprising a sign bit of a numerical value to be represented, a variable-length exponent part, and a variable-length mantissa part, where the total of these three constituents have a fixed length. According to this representation, the exponent part consists of a first bit string having a value corresponding to the value of the exponent and a second bit string comprising 1s or 0s having a length depending on the length of the first bit string, and the second bit string comprises 1s or 0s depending on a combination of the sign of the numerical value and the sign of the exponent. Further, the mantissa part has a length equal to the value obtained by subtracting the length (one bit) of the sign bit and that of the exponent part, from the fixed length.

The floating-point data operating unit is provided with a first circuit for generating the exponent part and the mantissa part expressed according to the conventional fixed-length representation from a floating-point number expressed according to the floating-point representation of the present invention, a second circuit for performing a floating-point number operation based on the exponent part and the mantissa part given in the fixed-length representation, and a third circuit for generating a variable-length exponent part and a variable-length mantissa part of the floating-point representation of the present invention from the result of said floating-point number operation.

BRIEF DESCRIPTION OF DRAWINGS

FIG. 3 is a table listing the floating-point number representation of values from −7 to 7 according to this invention;

FIGS. 7A and 7B constitute the flowchart of the operation for generating a floating-point number having a fixed-length exponent part according to the embodiment depicted in FIG. 4;

FIG. 9 is an example of the floating-point representation having a second variable-length exponent part.

DESCRIPTION OF A PREFERRED EMBODIMENT

Floating-point Representation

Figure 1:
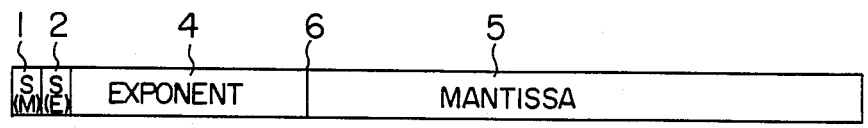
FIG. 1 shows floating-point data according to the conventional floating-point representation having a fixed-length exponent part.

Prior to proceeding to a concrete description of a floating-point data operating unit according to the present invention, the floating-point representation having a variable-length exponent part (referred to as the floating-point representation of the present invention hereinafter) which is utilized in an operating unit according to the present invention will be explained in detail.

(1) Assume that number x is represented with an exponent e and a mantissa m as follows, where x is not 0 (the case of x=0 will be explained later).

$$x = 2^e \cdot m \tag{1}$$

Where, e is an integer and m must satisfy the following relationships to take a unique value $$\left. \begin{array}{l} 1 \leq m < 2 \text{ or} \\ -2 \leq m < -1 \end{array} \right\} \tag{2}$$

According to the present invention, values of e and m represented as fixed-length data items are obtained from the data given in the floating-point representation of the present invention, an operation is conducted on the obtained data items, then the resultant values of e and m are used to generate the data in the format conforming to the floating-point representation of the present invention. Let us specify the fixed-length data formats for e and m.

The fixed-length data format of e conforms to the ordinary fixed-point representation, assuming that e is an integer.

The fixed-length data format of m conforms to the ordinary fixed-point representation, assuming that m is a fraction. To make it possible to represent values in the range satisfying expression (2), the fraction is represented as two binary digits on the left of the decimal point located at a position between the second digit position and the third digit position relative to the left end position.

If the value of e or m is negative, the fixed-length data representation of e or m is given as 2's complement.

When the condition of expression (2) is satisfied, the two digits on the left of the decimal point can take only the following values in the fixed-length data representation of m:

(a) 01 for $m > 0$ (b) 10 for $m < 0$

This means that another binary digit than the first digit (0 or 1), that is, the second digit can be restored from the first digit if the second digit is lost.

Accordingly, the fixed-length data representation of the mantissa is given as follows:

(a) $[0\ 1\ m_1\ m_2\ m_3\ldots]_2$ for $m > 0$ (3)

(b) $[1\ 0\ m_1\ m_2\ m_3\ldots]_2$ for $m > 0$ (4)

Digits on the right of the decimal point are respresented as $m_1$, $m_2$, $m_3$, and so on in this order.

The first bit indicates the sign of the numerical value and is also used in the floating-point representation of the present invention. As explained above, the second bit is the inverted value of the first bit; therefore, it will not directly appear in the floating-point representation of the present invention.

Let us define a value E which relates value e in expression (1) to the exponent part in the floating-point representation of the present invention.

(a) When $e \geq 0$, $$E = e + 1 \quad (5)$$

If E is positive, the most-significant bit among the significant digits of the binary representation of E is 1. Assume that the digits following the most-significant bit are represented as $e_n \ldots e_1$, then the binary representation of E is generally expressed as follows.

$$E = [0 \ldots 0\ 1\ e_n \ldots e_1]_2 \quad (6)$$

(b) When $e < 0$ $$E = e - 1 \quad (7)$$

If E is negative, the most-significant bit of the significant digits of the binary representation of E is 0. Assume that the digits following the most-significant bit are represented as $e_n \ldots e_1$, then the binary representation of E is generally expressed as follows.

$$E = [1 \ldots 1\ 0\ e_n \ldots e_1]_2 \quad (8)$$

In expressions (6) and (8), the binary representation of E is expressed in a fixed length sufficient to allow at least one bit 1 of 0 or 1 to be placed at the digit position preceding the most-significant bit 1 or 0. In these expressions, the first bit represents naturally the sign of the value of E. In this case, the value n is determined depending on the value of E according to the following expression.

$$n = [\log_2 (\max (E, -E-1))] \quad (9)$$

In this expression, the symbol $[\ldots]$ is the Gauss' symbol, where $[G]$ represents the maximum integer that does not exceed the value of G.

For example, since a decimal number one hundred is equal to $2^6 \times (25/16)$, the exponent is expressed as $e = 6$ from expression (1) and $E = 7$ is obtained from expression (5); consequently, the binary representation of E getting from the decimal 100 is as follows.

$$E = [0 \ldots 0\ 1\ 1\ 1]_2$$

Therefore, $n = 2$ is obtained, which leads to $e_2 = e_1 = 1$.

For $e \geq 0$, as described above, a bit whose value is 1 follows at least one bit whose value is 0 beginning from the first digit position of the fixed-length representation of E, and n significant bits $e_m, \ldots, e_1$ (1 1 is the example explained above) follow the bit whose value is 1. The value of n represents the number of significant bits following the bit whose value is 1.

In case of $e = -6$, E is calculated to be $-7$ from expression (7); so the following results.

$$E = [1 \ldots 1\ 0\ 0\ 1]_2$$

Therefore, $n = 2$ is obtained, further $e_2 = 0$ and $e_1 = 1$ are determined.

For $e < 0$ similarly, a bit whose value is 0 follows at least one bit whose value is 1 beginning from the first digit position of the fixed-length representation of E, and n significant bits $e_n, \ldots e_1$ (0 1 is the example above) follow the bit whose value is 1. In this case, the value of n also represents the number of significant bits following the bit whose value is 0.

For $e = 0$ or $e = 1$, the binary representation of the fixed-length data of E is $0 \ldots 01$ or $1 \ldots 10$, that is, these cases correspond to the case of $n = 0$.

(2) The exponent part of the following-point representation of the present invention is defined as follows by use of $e_n, \ldots, e_1$ expressed in the binary representation of E.

(a) When $x \geq 0$ and $e \geq 0$ $$[\underbrace{1 \ldots \ldots 1\ 0}_{n+1}\ \underbrace{e_n \ldots \ldots e_1}_{n}]_2 \quad (10)$$

(b) When $x \geq 0$ and $e < 0$ $$[\underbrace{0 \ldots \ldots 0\ 1}_{n+1}\ \underbrace{e_n \ldots \ldots e_1}_{n}]_2 \quad (11)$$

(c) When $x<0$ and $e \geqq 0$ $$\cdot [\underbrace{0 \ldots 0}_{n+1} 1 \underbrace{\bar{e}_n \ldots \bar{e}_1}_{n}]_2 \qquad (12)$$

(d) When $x<0$ and $e<0$ $$[\underbrace{1 \ldots 1}_{n+1} 0 \underbrace{\bar{e}_n \ldots \bar{e}_1}_{n}]_2 \qquad (13)$$

According to the expression above, a bit whose value is 0 or 1 is placed preceding $e_n, e_{n-1}, \ldots e_1$ obtained as the binary representation of E or preceding the inverted bits thereof, i.e., $\bar{e}_n, \bar{e}_{n-1}, \ldots, \bar{e}_1$; further preceding the bit whose value is 0 or 1, n+1 bits whose value are 1s or 0s are added. Whether 0s or 1s are to be added or not is determined depending on a combination of the sign of the number x and that of the exponent e. Therefore, the length of the exponent part according to the floating-point representation of the present invention is 2n+2, which varies depending on the value of e. Moreover, the exponent part of the floating-point representation does not contain any special bit for directly indicating the sign of the exponent.

In case of n=0, $[1\ 0]_2$ or $[0\ 1]_2$ is obtained depending on whether or not E satisfies one of the conditions given by expressions (10)–(13).

(3) The bit for indicating the sign information of the numerical value is 0 if m is positive and it is 1 if m is negative. This is the same as in the conventional floating-point representation. This means that the first bit of expression (3) or (4) is adopted as the sign bit.

(4) The length of the mantissa part according to the floating-point representation of the present invention is obtained as l−(2n+3) bits attained by subtracting both the length of the bit for indicating the sign information of the numerical value (that is, one bit) and the length of the exponent part (that is 2n+2 bits) from that of the whole area (l bits) predetermined for expressing the whole data value.

The mantissa part is expressed by means of the l−(2n+3) bits of the bits ($m_1, m_2, m_3$, in expression (3) or (4)) obtained beginning from the leftmost bit $m_1$, that is, the mantissa part is expressed according to the partial bit string obtained from the mantissa part expressed according to the fixed-length representation. Each of the resultant bits has the following value: The corresponding bit is 0 if $m_1$ is 0 or it is 1 if $m_1$ is 1. This rule is also applied to $m_2, m_3$, and so forth.

Figure 2A:
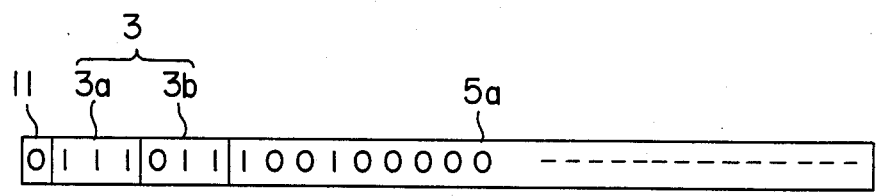
FIG. 2A depicts floating-point data according to the floating-point representation having a first variable-length exponent part of the present invention.

(5) The bit configuration according to the floating-point representation of the present invention comprises a sign bit of the numerical value 11, and an exponent part 3, and a mantissa part 5a as shown in FIG. 2A.

The exponent part includes a first part 3a and a last part 3b. The first part 3a comprises n+1 bits comprising 1s or 0s. The last part 3b comprises a bit obtained by inverting one of the bits in the first part 3a and significant n bits of the numerical value E, that is, $e_n \ldots e_1$ following the inverted bit. Note that the sign bit 2 shown in the conventional floating-point representation (FIG. 1) is not directly contained in the exponent part 3.

As can be known from expression (9), it is one of the features of the floating-point representation of the present invention that the overall length of the exponent part 2n+2 becomes smaller as the absolute value of E (therefore, that of e) decreases.

A number in the vicinity of one is often used in the floating-point number operation. Since the length of the exponent part can be reduced and that of the mantissa part can be increased for such a number according to the floating-point representation of the present invention, the value of the number can be expressed with a higher precision as compared with the conventional floating-point representation. On the other hand, a positive or negative number whose absolute value is too large to be expressed in the conventional floating-point representation can be expressed according to the floating-point representation of the present invention because the length of the exponent part can be increased to accommodate the data of the number.

Another feature of the floating-point representation of the present invention resides in that the length of the exponent part can be determined according to the bit string whose bits are entirely 0s or 1s in the first half of the exponent part.

Still another feature of the floating-point representation of the present invention is that the sign of the exponent can be identified without providing the sign bit for the exponent. As can be clear from expressions (10)–(13), since all the bits in the first exponent part 3a are 1s or 0s depending on a combination of the sign of the numerical value and that of the exponent, whether the exponent is negative or positive can be judged according to whether or not the sign bit 11 of the numeric value has the same value as that of one of the bits in the first exponent part 3a.

Whether all the bits are 0s or 1s in the first exponent part 3a does not directly depend on the sign of the exponent because the floating-point representation of the present invention is specified so that the relationships (equals to, greater than, or less than) between numerical values obtained by expressing a bit string according to the floating-point representation of the present invention coincide with those between numerical values obtained by interpreting the bit string as that according to the conventional fixed-point representation.

Figure 2B:
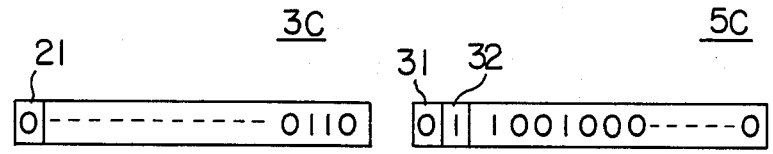
FIG. 2B depicts an exponent and a mantissa parts having fixed length according to the invention.

FIG. 2B illustrates an example of floating-point representation of a numeric value 100.

Since the numeric value 100 is positive, the value of sign bit 11 is 0. The value of n is 2, and $e_2$ and $e_1$ obtained from the value of E are both 1, so the exponent part 3 is expressed as follows and the length thereof is 2n+2=6 bits.

Exponent part 3 of 100=$[1\ 1\ 1\ 0\ 1\ 1]_2$ Furthermore, the fixed-length representation of m is obtained as followed as follows according to expression (3).

$$m = [0\ 1\ 1\ 0\ 0\ 1]_2$$

Therefore, the mantissa part 5a of 100 is expressed as:

$$[1\ 0\ 0\ 1\ 0\ 0\ 0\ \ldots]_2$$

The dots on the right part mean that the same value is expressed irrespective of the number of 0s to be added.

(6) Numeric values 0 and infinity are expressed as follows according to the floating-point representation of the present invention.

$$0: \text{``0 0 0 } \ldots \text{ 0''}$$

Infinity: "1 0 0 ... 0"

The numbers other than those above will be explained in the following paragraphs.

(7) FIG. 3 illustrates a table listing the floating-point numbers representation of values ranging from −7 to 7 according to the floating-point representation of the present invention. The overall data length is assumed to be eight bits.

OUTLINE OF THE OPERATING UNIT

Figure 4:
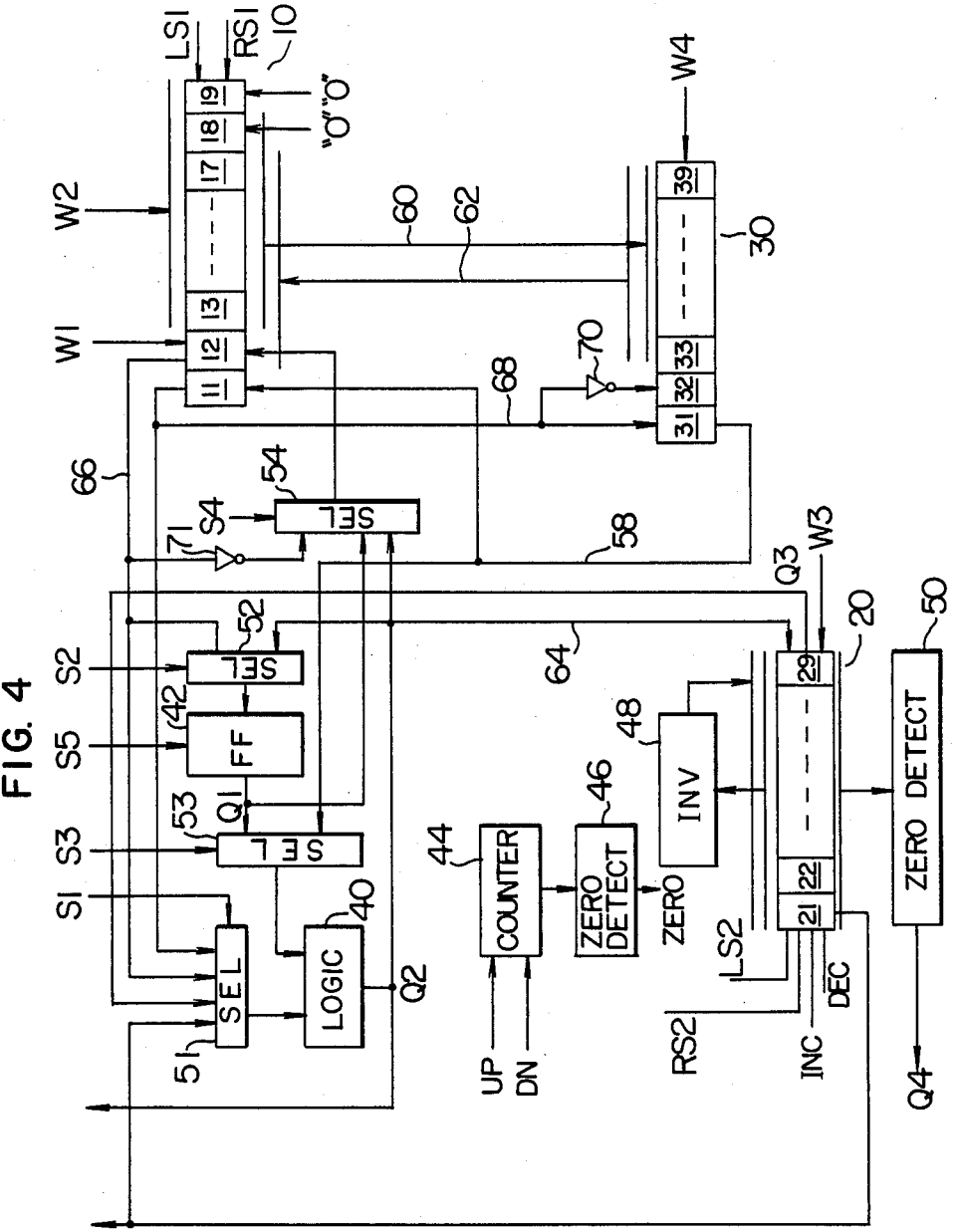
FIG. 4 illustrates a block diagram of the main part of a floating-point data operating unit of the present invention.

FIG. 4 illustrates the block diagram of the main part of a floating-point data operating unit as an embodiment according to the present invention.

In FIG. 4, reference numeral 10 indicates a register for storing a floating-point number according to the floating-point representation of the present invention, reference numerals 20 and 30 represent registers for storing the exponent part and the mantissa part respectively, reference numeral 40 indicates a logic circuit for outputting 1 when the two inputs thereof coincide with each other, reference numeral 42 represents a flip-flop for setting an input when signal S4 is given, reference numeral 44 indicates a counter for performing a count-up or a count-down in respect to a signal UP or a signal DN, reference numeral 46 represents a zero detector for outputting a signal Zero when the value stored in the counter 44 is zero, reference numeral 48 indicates an inverter for inverting each bit in an exponent part register 20, reference numeral 50 represents a zero detector for outputting a signal Q4 when all the bits in the exponent part register 20 are zeros, and reference numerals 51-54 indicate selectors, each selector being provided for selecting one input from a plurality of inputs in response to a signal S1, S2, S3, or S4.

The length of the floating-point number register 10 is assumed to be k+1 bits. Reference numeral 11 indicates a 1-bit register for storing the sign bit. Reference numerals 12-19 represents k bits constituting the exponent and mantissa parts which are configured by a shift register having the following functions:

(1) The data is shifted one bit to the right each time a trigger LS1 for a left shift is supplied to the shift register.

(2) The data is shifted one bit to the left each time a trigger RS1 for a right shift is supplied thereto. In this case, an output from the selector 52 is inserted (shifted) in the position of bit 12.

(3) The output from the selector 52 is stored in bit 12 when a write signal W1 is given.

(4) Bit 11 fetches bit 31 of register 30 through line 58 when a write signal W2 is supplied. Similarly, bits 12-17 fetch bit 33-39 respectively from register 30 through line 62.

Zeros (0s) are written in bits 18 and 19 when a write signal W2 is input.

These circuits are controlled by a control circuit (not shown).

Exponent part register 20 is formed of a counter having the count function. Its length is k bits and has the following functions:

(5) The data is shifted one bit to the left each time a trigger LS2 for a left shift is supplied and an output from logic circuit 40 is stored in the position of the lowermost bit 29.

(6) The data is shifted one bit to the right each time a trigger RS2 for a right shift is supplied.

(7) The value is incremented by one when a trigger INC for a value incrementation is given.

(8) The value is decremented by one when a trigger DEC for a value decrementation is supplied.

(9) The value of each bit supplied from inverter 48 is stored as data when a write signal WS is applied.

The mantissa part register 30 is formed of a shift register whose length is k bits and has the following functions:

(10) Bit 11, the inverted bit of bit 11, and bits 13-18 of floating-point number register 10 are stored in the positions of bit 31 to bit 39 of the mantissa part register when a write signal W4 is given. Bit 11 is supplied through line 68, the inverted bit of bit 11 is supplied through line 68 and inverter 70, and bits 13-18 are fed via line 60.

In addition to the aforementioned control signals LS1, RS1, W1, W2, LS2, RS2, W3, DEC, INC, and W4 for floating-point number register 10, exponent part register 20, and mantissa part register 30, the control circuit (not shown) outputs control signals S1-S4 for selectors 51-54, set signal S5 for flip-flop 42, and control signals UP and DN for counter 44 in reply to output Q2 from logic circuit 40, outputs Zero and Q4 from zero detectors 46 and 50, and bit 21 output from exponent part register 20, respectively.

For the shift registers 10 and 20, the overflowed bit is lost and the bit to be supplied accordingly is 0 unless otherwise specified.

In FIG. 4, the floating-point number operation is carried out as follows:

(1) The data expressed in the floating-point representation of the present invention is processed to obtain an exponent part and a mantissa part according to a fixed-length representation, then these exponent and mantissa parts are stored in registers 20 and 30, respectively.

(2) A floating-point number operation is carried out on the data items stored in registers 20 and 30. In case of addition or subtraction for example, the exponent part is adjusted, operated, and normalized. The operation results, that is, the exponent and mantissa parts expressed in the fixed-length representation are stored in registers 20 and 30.

(3) The data items of the exponent and mantissa parts stored respectively in registers 20 and 30 are processed to generate data expressed in the floating-point representation of the present invention, then the generated data is stored in register 10.

Of these steps, step 2 is performed by an operating means (not shown) which is the same as the corresponding conventional means, further in the same procedure as used for the floating-point representation having the fixed-length exponent part. For this reason, explanation of step 2 will be omitted. The following explanations are given for other than the case where x is zero. Like in the conventional floating-point representation, the case where x is zero is treated separatedly and is not described in the following paragraphs. This means that the processing described in Item 1 to be explained in the following paragraphs is not performed if the data obtained as a value expressed in the floating-point representation of the present invention by the processing explained in step 1 above contains the all-zero data. Moreover, the processing described in Item 4 to be explained in the following paragraphs is not executed if the fixed-length mantissa part obtained by the processing in step 4 above contains the all-zero data.

(1) Generation of the Fixed-Length Exponent and Mantissa Parts.

(i) Determination of the Length of the First Exponent Part

Since a variable-length exponent part 3 and a variable-length mantissa part 5a are provided in the floating-point representation of the present invention as shown in FIG. 2, the boundary between the exponent part 3 and the mantissa part 5a must be detected to create the exponent and mantissa parts. According to said floating-point representation, the exponent part 3 follows the sign bit 11 and the value of each bit in the first part 3a differs from the first bit of the last part 3b as shown in expressions (10)–(13). These relationships can be used to obtain the number of bits in the first exponent part 3a. The numbers of bits is equal to n+1 according to floating-point representation of the present invention. If the number of bits is determined, since the last exponent part 3b is n+1 bits following the first part 3a, the boundary between the exponent part 3 and the mantissa part 5a is found. The mantissa part 5a is obtained as the remaining bits following the last exponent part 3b.

As explained above, the exponent part 3 and the mantissa part 5a can be separated.

Figure 5A:
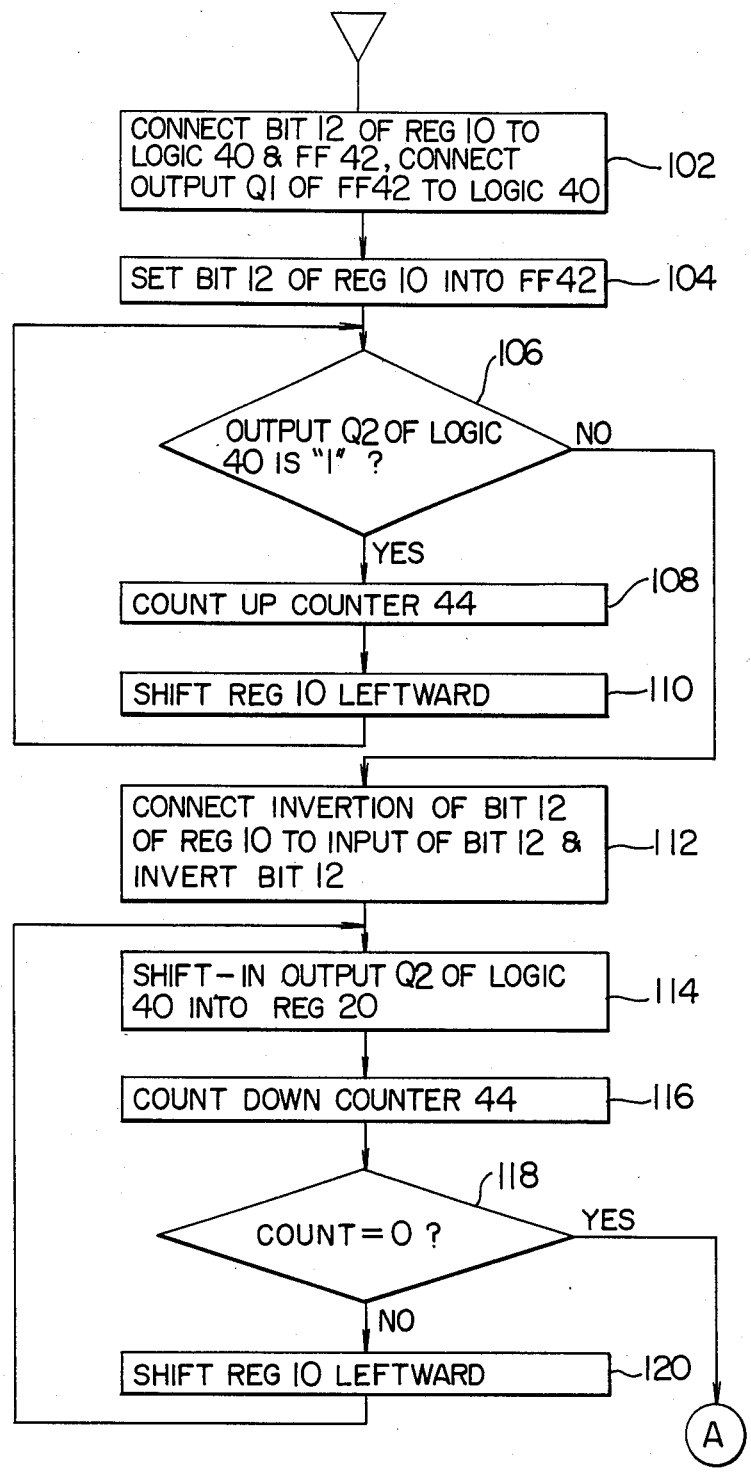
FIGS. 5A and 5B configure the flowchart for generating the fixed-length exponent part and the fixed-point mantissa part in the embodiment shown in FIG. 4.
Figure 5B:
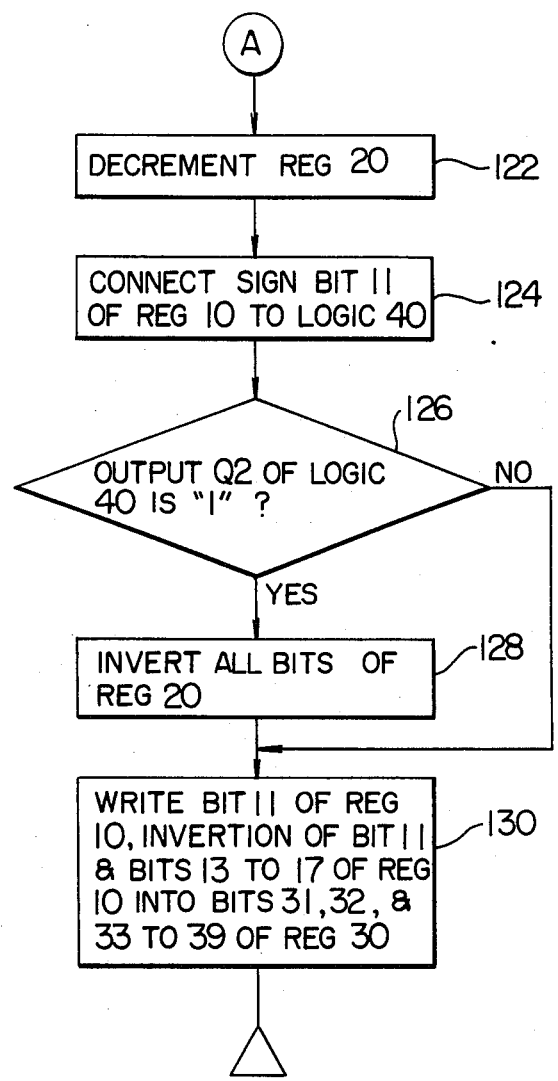
Figure 6A:
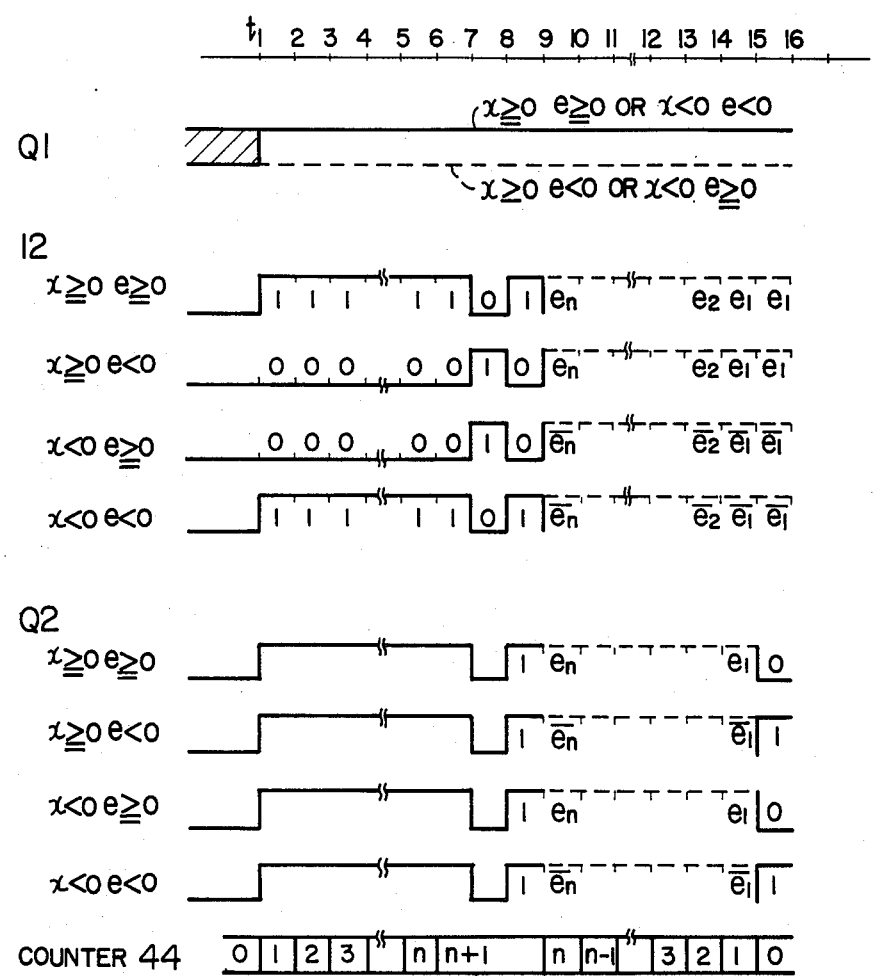
FIGS. 6A and 6B construct the signal timing chart for the generation illustrated in FIGS. 5A and 5B.

Among the operations of the unit whose main part is illustrated in FIG. 4, operation for detecting the length of the first exponent part 3a will be explained in the following paragraphs in conjunction with FIG. 5B, 6A, and 6B.

Figure 6B:
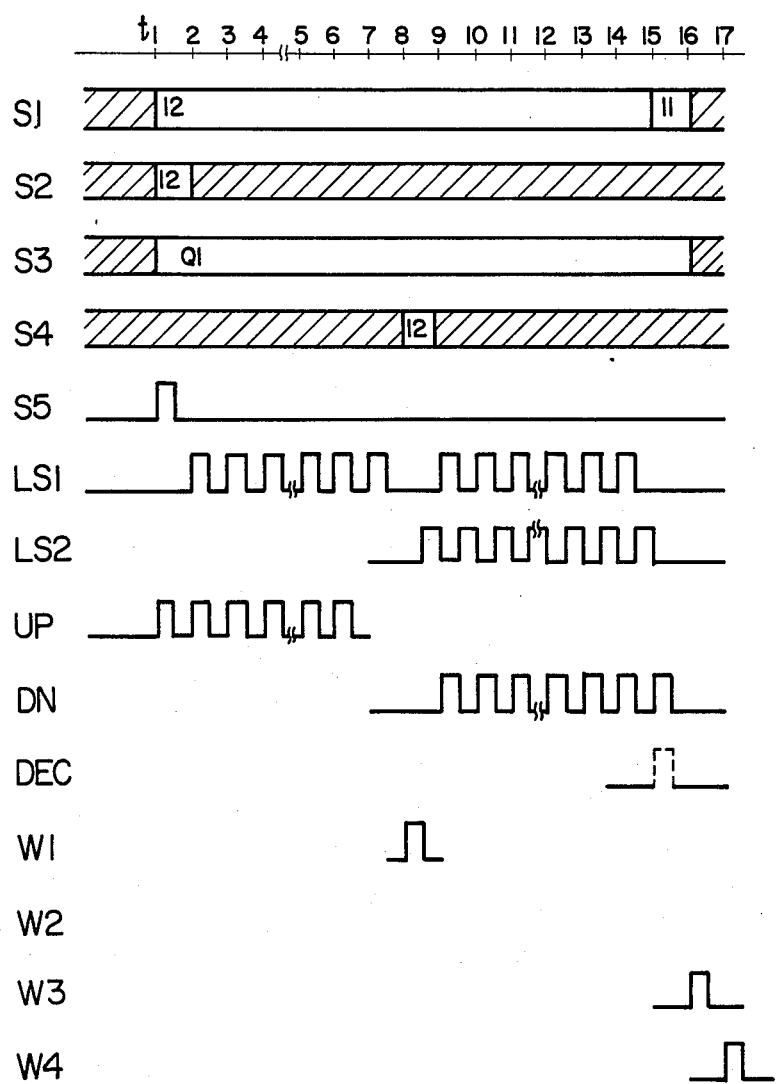

In FIG. 6B, the shaded portion indicates the range in which the operation of the respective selectors does not affect the unit operation.

A value expressed in the floating-point representation having the variable-length exponent part is beforehand set in register 10 for a floating-point number operation. Furthermore, the registers 20 and 30, flip-flop 42, and counter 44 are assumed to be reset in advance.

An output of the first bit 12 of the exponent part from floating-point number register 10 is connected to an input to flip-flop 42 and to a first input of logic circuit 40, further an output from flip-flop 42 is connected to a second input of logic circuit 40. This connection is achieved by use of selectors 52 and 53 in response to signals S1–S3. Bit 12 is set to flip-flop 42 in reply to signal S5 (in step 104). As can be known from expressions (10)–(13), output Q1 from flip-flop 42 is 1 for $x \geq 0$ and $e \geq 0$ or for $x < 0$ and $e < 0$, and is 0 for $x \geq 0$ and $e < 0$ or for $x < 0$ and $e \geq 0$. However, output Q2 from logic circuit 40 is 1 irrespective of a combination of the signs of x and e because the two inputs to the logic circuit are both bit 12. In response to output Q2 whose value is 1, signal UP is output from the control circuit (not shown), so the value of counter 44 becomes 1 (steps 106 and 108). Then, register 10 performs a left shift operation with bit 12 output, while output Q1 from flip-flop 42 is kept connected to logic circuit 40 (step 110). As a result, the bit following the exponent part 3 is shifted to the position of bit 12. If this new bit belongs to the first exponent part 3a, the value of said new bit is equal to that of the first bit in the exponent part set in flip-flop 42 irrespective of a combination of the signs of x and e. Consequently, the output from logic circuit 40 continues to be 1, thus counter 44 is counted up in response to said output whose value is 1. This operation is repeated thereafter until the value of output Q2 from logic circuit 40 becomes zero. Output Q2 becomes zero when the first bit of the second exponent part 3b different from the first bit of the first exponent part 3a is inserted (shifted) in the position of bit 12. Therefore, the value of counter 44 at this point indicates the length (n+1) of the first exponent part 3a. The length of the first exponent part can be thus obtained.

(ii) Creation of the Fixed-Length Exponent Part

FIG. 2B depicts the data formats of numeric values to be stored in the exponent register and mantissa registers, respectively. Exponent register 20 contains the 2's complement of exponent e if exponent e is negative. The first bit 21 is a sign bit which is 0 or 1 depending on whether the exponent is positive or negative. FIG. 2B illustrates the fixed-length representation of a numerical value 100. In this case, register 20 contains the binary representation 0...011 of the exponent e (=6), and the first bit thereof is 0. The exponent part 3 according to the floating-point representation of the present invention contains the data $e_n, \ldots, e_1$ or $\bar{e}_n, \ldots, \bar{e}_1$ related to value E comprising exponent e; however, the contained data is not identical to the exponent e itself. Therefore, the exponent part 3 according to said floating-point representation must be processed to create an exponent expressed in the first-length representation. Since said exponent part 3 does not contain the sign bit 21 of the exponent part expressed in the fixed-length representation, the exponent must be created in the fixed-length representation so that the sign bit 2 is determined according to the sign of exponent e.

The exponent part 3 according to the floating-point representation of the present invention contains data $e_n, e_{n-1}, \ldots, e_1$ or $\bar{e}_n, \bar{e}_{n-1}, \ldots, \bar{e}_1$ selected to numerical value E, therefore, the binary representation of numerical value E can be obtained from these data items to determine exponent e from the obtained value of E by use of expression (5) or (6). However, the value of exponent e varies depending on a combination of the signs of numerical value x and exponent e as the relationship between the value of the exponent part according to the floating-point representation of the present invention and data $e_n, e_{n-1}, \ldots, e_1$.

The sign of numerical value x is given by the first bit 1 of the floating-point representation of the present invention. The sign of exponent e is determined as follows:

The following relationships are obtained from the conditions that distinguish between four cases as given by expressions (10)–(13).

(i) In case of $x \geq 0$ and $e \geq 0$, the sign bit 1 of the numerical value is 0 and the first bit of the first exponent part 3a is 1, that is, they are not identical. Similarly, in case of $x < 0$ and $e \geq 0$, the sign bit 1 of the numerical value is 1 and the first bit of the first exponent part 3a is 0, that is, they are not identical.

(ii) In case of $x \geq 0$ and $e < 0$, the sign bit 1 of the numerical value and the first bit of the first exponent part are both equal to 0. Similarly, in case of $x < 0$ and $e < 0$, the sign bit 1 of the numerical value and the first bit of the first exponent part 3a are both equal to 1.

Consequently, whether the sign of exponent e is positive or negative can be determined depending on whether the sign bit 1 of the numerical value is unequal or equal to the first bit of the first exponent part 3a.

When the sign of exponent e is thus obtained, the data of exponent e expressed in the fixed-length representation can be determined as follows in principle.

(a) When $x \geq 0$ and $e \geq 0$

As can be clear from expression (10), the bits of the last exponent part $3b$ are identical to 0, $e_n, e_{n-1}, \ldots, e_1$. In consideration of expression (6), the data of numerical value E (including the sign bit) expressed in the fixed-length representation can be obtained by inverting the first bit (value 0) of the last exponent part $3b$ and by adding the necessary number of bits whose values are 0s preceding the inverted bit. Therefore, the value of e is obtained from expression (5) as $e = E - 1$.

(b) When $x \geq 0$ and $e < 0$

As is clear from expression (11), the bits of the last exponent part $3b$ are equal to 1 $e_n \ldots e_1$. By taking expression (8) into consideration, the data of numerical value E (including the sign bit) expressed in the fixed-length representation can be created by inverting the first bit (value 1) of the last exponent part $3b$ and by adding the necessary number of bits whose values are 1s preceding said inverted bit. Consequently, the value of e can be obtained from expression (7) as $e = E + 1$.

(c) When $x < 0$ and $e \geq 0$

As can be clear from expression (12) the last exponent part $3b$ is 1 $\bar{e}_n \ldots \bar{e}_1$; therefore, the value of E given by expression (6) can be obtained from these data items by inverting the bits of $e_n \ldots e_1$, that is, the data of the last exponent part excluding the first bit (value 1) to generate a bit string 1 $\bar{e}_n \ldots \bar{e}_1$ and by adding the necessary number of bits whose value is 1s preceding said bit string 1 $\bar{e}_n \ldots \bar{e}_1$. The value of the exponent part (including the sign bit) expressed in the fixed-length representation can be obtained from expression (5) as $e = E - 1$.

(d) When $x < 0$ and $e < 0$

As is given by expression (13), the last exponent part $3b$ is equal to 0 $\bar{e}_n \ldots \bar{e}_1$. Therefore, the value of E represented by expression (8) can be obtained from these data items by inverting the bits $e_n \ldots e_1$, that is, the data of the last exponent part $3b$ excluding the first bit (value 0) to generate a bit string 0 $\bar{e}_n \ldots \bar{e}_1$ and by adding the necessary number of bits whose values are 1s preceding the obtained bit string 0 $\bar{e}_n \ldots \bar{e}_1$. The value of the exponent part expressed in the fixed-length representation can be obtained from expression (7) as $e = E + 1$.

However, the basic method explained above has the following problems.

(i) The bit string to be added for creating data E values depending on a combination of the signs of x and e. For example, in case of $x \geq 0$ and $e \geq 0$ or in case of $x < 0$ and $e \geq 0$, the bit string consists of 0s; in case of $x \geq 0$ and $e < 0$ or in case of $x < 0$ and $e < 0$, the bit string consists of 1s.

(ii) Addition or subtraction must be used to obtain the value of e expressed in the fixed-length representation from the data E created in step 1 above. For example, if $x \geq 0$ and $e \geq 0$ or if $x < 0$ and $e \geq 0$, the value of e expressed in the fixed-length representation is obtained from $e = E - 1$; if $x \geq 0$ and $e < 0$ or if $x < 0$ and $e < 0$, the value of e is obtained from $e = E + 1$.

In the following embodiment, the procedures listed below are utilized so that the fixed-length exponent part is obtained through the same method regardless of differences among combinations of signs of x and e.

(a') When $x \geq 0$ and $e \geq 0$

The same method as the basic method explained above is adopted.

(b') When $x \geq 0$ and $e < 0$

The first bit (value 1) of the last exponent part $3b$ is inverted, then the last exponent part $3b$ is entirely inverted. Data $\overline{E}$, the inverted data of E can be obtained by adding the necessary number of bits whose values are 0s preceding the data obtained by inverting the first bit and by entirely inverting the last exponent part $3b$. Then, one is subtracted from $\overline{E}$ and the resultant data is inverted. This is because the following relationship is generally satisfied:

$$\overline{\overline{E} - 1} = E + 1 \tag{14}$$

This means that the data resulted from operations above is equal to e.

(c') When $x < 0$ and $e \geq 0$

The first bit of the last exponent part $3b$ is inverted, then the last exponent part $3b$ is entirely inverted and one is subtracted from the obtained data. Although the first bit of the last exponent part $3b$ is inverted twice in this method, since the inversion is also carried out for other combinations of the signs of x and e, that is, the same control can be utilized advantageously for a plurality of cases.

(d') When $x < 0$ and $e < 0$

The first bit of the last exponent part $3b$ is inverted. The fixed-length representation of $\overline{E}$ can be obtained by adding the necessary number of bits whose values are 0s to the inverted data. Like in step b' above, the fixed-length representation of e can be obtained from expression (14) by subtracting one from the resultant data and by inverting the data obtained as the result of said subtraction.

After the first exponent part $3a$ is inverted in these four steps, the overall first exponent part is inverted in case of $x \geq 0$ and $e < 0$ or in case of $x < 0$ and $e \geq 0$, while it is not inverted in other cases. It will be understood that whether the first exponent part $3a$ is inverted or not depends on whether the first bit of the first exponent part $3a$ is 0 or not. Based on this fact, the inversion control is automatically determined and carried out in the following embodiment. The different point among these four steps is whether the data obtained as the result of the subtraction of one is inverted (in case of $x > 0$ and $e < 0$ or in case of $x < 0$ and $e < 0$) or not.

Creation of the fixed-length exponent part will be explained in conjunction with concrete embodiments in the following paragraphs.

As explained before, when the detection of the length of the first exponent part is completed, bit 12 of register 10 contains the first bit of the last exponent part $3b$. To invert the first bit (step 112), signal S4 for connecting the output of inverter 71 which inverts the output of bit 12 to the input of bit 12 is generated, then write signal W1 is supplied to bit 12.

Trigger LS2 is applied to register 20 so as to insert (shift in) output Q2 of logic circuit 40 to the least-significant bit 29 of register 20 (step 114). Then, register 10 performs the left shift operation sequentially (step 120). Each time a new data item is shifted to bit 12, the corresponding output Q2 from logic circuit 40 is shifted to register 20 (step 114). These operations are repeated until all n+1 bits of the last exponent part $3b$ are shifted to and stored in register 20. To determine the time when these operations are finished, signal DN is applied to counter 44 each time a shift-in operation takes place on register 20, thereby enabling the count-down operation (step 116). When the count value becomes 0, the shift-in operation on register 20 is terminated.

Through the shift operation above, flip-flop 42 contains the first bit of the first exponent part 3a which is originally stored in register 10, and output Q1 of flip-flop 42 is 1 for $x \geq 0$ and $e \geq 0$ or for $x < 0$ and $e < 0$, or it is 0 for $x \geq 0$ and $e < 0$ or for $x < 0$ and $e \geq 0$. Consequently, the output of logic circuit 40 is equal to the data obtained by inverting bit 12 if $x \geq 0$ and $e < 0$ or if $x < 0$ and $e \geq 0$. In the former case, register 20 contains 0 0 ... 1 $\bar{e}_n ... \bar{e}_1$ which is equal to $\bar{E}$. In the latter case, register 20 stores 0 0 ... 0 1 $e_n ... e_1$ which is equal to E. Naturally, the inversion is not carried out if $x \geq 0$ and $e \geq 0$ or if $x < 0$ and $e < 0$. This means that register 20 contains 0 0 ... 0 1 $e_n ... e_1$ which is equal to E in the former case. In the latter case, register 20 contains 0 0 ... 0 1 $\bar{e}_n ... \bar{e}_1$ which is equal to $\bar{E}$. As a result, register 20 stores the following data after the shift operation explained above.

E when $e \geq 0$
$\bar{E}$ when $e < 0$

Then, signal DEC is input to register 20 to decrement the value of register 20 by one (step 122). As a result, the contents of register 20 represent $E-1$ for $e>0$; this is identical to the value of exponent e obtained from the definition of E. For $e<0$, the contents of register 20 represent $E-1$, which is equal to $\overline{E+1}$, that is, $\bar{e}$. To determine whether or not the contents of register 20 are to be inverted, signal S1 is routed to selector 41 so that the numeric value sign bit 11 of register 10 is input to logic circuit 40 (step 124). The value of numeric value sign bit 11 is equal to output Q1 of flip-flop 40 only when $e<0$; output Q2 of logic circuit 40 is 1 only in this case. The control circuit (not shown) judges whether output Q2 is 1 or not (step 126). If Q2 is 1, write signal W3 is transferred to register 20 to write the inverted bit from inverter 48 in register 20 (step 128). For $e<0$, the value of register 20 is thus $\overline{E-1}$. Since $\overline{E-1}$ is equal to $E+1$, the contents of register 20 equal to e.

Compared with the case when e is positive, the case when e is negative can be processed in the same way excepting that the contents of register 20 are inverted.

(iii) Creation of the Fixed-Length Mantissa Part

The fixed-length mantissa part to be created is given by expression (3) or (4), that is, the first bit corresponding to the sign of the numerical value, the second bit obtained by inverting the first bit, and bits $m_1, m_2, m_3, \ldots$ following the decimal point. FIG. 5C illustrates the fixed-length mantissa part of a numerical value 100 stored in register 30. The first bit 31 and the second bit 32 are 0 and 1 respectively; further, $m_1 = 1$, $m_2 = m_3 = 0$, $m_4 = 1$, and $m_i$ ($i \geq 5$) = 0. The first bit 31 is obtained directly from the first bit 11 (FIG. 2A) expressed in the floating-point representation of the present invention. Moreover the second bit 32 is generated by inverting the first bit 11 (FIG. 2A). Bits $m_1, m_2, m_3, \ldots$ following the decimal point are gained from the mantissa part 5a expressed in the floating-point representation. The number of bits in said mantissa part 5a varies depending on numeric value x; therefore, the number is generally different from that predetermined as the number of bits following the decimal point in the mantissa part expressed according to the fixed-length representation. If the number of bits in the mantissa part according to the floating-point representation of the present invention is less than the predetermined number of bits, the necessary number of bits whose values are 0s are added following the mantissa part 5a expressed in the floating-point representation, thereby obtaining the bits following the decimal point in the fixed-length mantissa part. On the other hand, if the number of bits in said mantissa part 5a is more than the predetermined number of bits, the predetermined number of bits obtained from said mantissa part 5a beginning from the first bit thereof can be used as the bits $m_1, m_2, m_3 \ldots$ following the decimal point in the fixed-length mantissa part.

As explained before, after the exponent part is created according to this embodiment, bits 13–19 of register 10 contain the mantissa part consisting of $k-1$ bits. For example, bit 13 stores $m_1$. The data consisting of $k-2$ bits obtained by excluding bit 19 from these $k-1$ bits are stored in bits 33–39 of register 30. Further, the numeric value sign bit 11 of register 10 is set to bit 31 of register 30 and the inverted bit obtained through inverting bit 11 by inverter 70 is set to bit 32. For these data setting operations to register 30, signal W4 is created by the control circuit (not shown).

As explained above, the fixed length exponent part and the fixed-length mantissa part are created.

(iv) Creation of the Exponent and Mantissa Parts According to the Floating-Point Representation of the Present Invention An arithmetic logic operation can be performed in an ordinary method by use of a combination of the fixed-length exponent part 3C and the fixed-length mantissa part 5c which are created according to the principle explained above. The operation result is expressed with a combination of the fixed-length exponent part 3C and the fixed-length mantissa part 5C in the same way as shown in FIG. 2B. The following paragraphs explain the principle adopted for converting a data item expressed according to the fixed-length representation into a data item expressed according to the floating-point representation of the present invention.

This method is, in principle, the reverse of that for converting a data item expressed according to the floating-point representation of the present invention into a data item expressed according to the fixed-length representation.

Concretely, this method varies depending on combinations of the signs of numeric value x and exponent e. The sign of numeric value x and that of exponent e are given as the first bit 31 of the fixed-length mantissa part 5C and the first bit 21 of the fixed-length exponent part 3C.

For example, in case of $x \geq 0$ and $e \geq 0$, the fixed-length representation of E given by expression (5) is obtained by adding one to the fixed-length exponent part 3C according to expression (5). From this result, the length $n+1$ bits of the portion other than the leading bit string consisting of 0s (that is, the bit string starting from 1: 1 $e_n \ldots e_1$) is calculated. The first bit (value 1) of this portion is inverted and a bit string comprising $n+1$ bits whose values are 1s are added preceding the inverted value, thereby obtaining the exponent part given by expression (10) according to the floating-point representation of the present invention. Even when the combination of the signs of x and e is other than the case above, the method for creating the exponent part according to the floating-point representation of the present invention can be readily thought of from the preceding explanations, hence the explanation will be dispensed with.

In the present embodiment, a reverse method of that adopted for the fixed-length exponent and mantissa parts is utilized as an operating method that is independent of a combination of the signs of x and e, thus the data of a floating-point number expressed according to the floating-point representation of the present invention can be made to be independent of the signs of x and e to the maximum extent. This method will be clarified in the following paragraphs.

According to FIG. 4, the fixed-length exponent part and the fixed-length mantissa part are beforehand stored in registers 20 and 30, respectively; further, counter 44 is reset in advance.

The numeric value sign bit 31 of register 30 is written in bit 11 of register 10 through line 58, and bits 33–39 of register 30 are written in bits 13–17 via line 62. Furthermore, 0s are written in bits 18 and 19 (step 140). This processing is the reverse of that of step 130 shown in FIG. 5B. These write operations are caused when write signal W2 is created. Since bit 32 of register 30 is an inverted bit of bit 31, bit 32 is not written in register 10. The mantissa part is thus written in register 10.

To create the exponent part according to the floating-point representation of the present invention, the exponent sign bit 21 of register 20 is connected to a first input of logic circuit 40 via selector 51, and the numeric value sign bit 31 of register 30 is connected to a second input of the logic circuit through selector 53. Moreover, output Q2 of logic circuit 40 is connected to an input of flip-flop 42 via selector 52 (step 142). Under this condition, signal S5 causes output Q2 to be set to flip-flop 42 (step 144). Consequently, output Q1 of flip-flop 42 is 1 if $x \geq 0$ and $e \geq 0$ or if $x < 0$ and $e < 0$, or it is 0 in other cases.

As a result, output Q3 is inverted only for a combination of $x \geq 0$ and $e < 0$ or for a combination of $x < 0$ and $e \geq 0$ by inputting shift-out signal Q3 from the low-order side of register 20 and output Q1 from flip-flop 42 to logic circuit 40. Therefore, output Q3 of register 20 is connected to a first input of logic circuit 40 via selector 51, an output of flip-flop 42 is connected to a second input of logic circuit 40, and output Q2 of logic circuit 40 is connected to an input of bit 12 of register 10 through selector 54 (step 146). In this situation, the contents of register 20 are changed as follows.

The control circuit (not shown) judges whether the exponent sign bit 21 is 1 or not (step 148). If bit 21 is 1, signal W3 is output to invert all bits of register 20 (step 150). This inversion is not conducted if bit 21 is 0. Step 150 is the reverse of step 128 shown in FIG. 5B. For creating the fixed-length exponent part, since the exponent sign bit is not included in the floating-point representation of the present invention, the exponent sign bit is judged according to the numeric value sign bit and the first bit of the first part of the variable-length exponent part (steps 124 and 126). On the other hand, when the variable-length exponent part is to be created from the fixed-length exponent part, the above-mentioned processing is not necessary because the exponent sign bit 21 is available in this case.

Then, one is added to the contents of register 20. For this purpose, signal INC is created (step 152). This processing is the reverse of step 122 shown in FIG. 5B. Consequently, register 20 contains $e+1$, that is, $E$ if the exponent is positive; and it contains $\bar{e}+1$, that is, $\bar{E}$ if the exponent is negative. This means that $0\ 0\ \ldots\ 0\ e_n\ \ldots\ e_1$ is set to register 20 if the exponent is positive and $0\ 0\ \ldots\ 0\ \bar{e}_n\ \ldots\ \bar{e}_1$ is set to register 20 if it is negative.

Just as the reverse processing of that for obtaining the fixed-length exponent part from the exponent part expressed in the floating-point representation of the present invention, these data items above are fetched from register 20 sequentially beginning from the low-order side and are written in bit 12 of register 20. However, if the write operation is carried out under the condition of $x \geq 0$ and $e \geq 0$ or under the condition of $x < 0$ and $e \geq 0$, that is, the sign of x is not equal to that of e, these data items must be inverted at the read operation. The inversion is achieved as follows.

Trigger RS1 for a right shift is created and output Q3 of register 20 is shifted (step 154). At the same time, counter 44 is counted up (step 156). Then, register 20 performs a right shift operation (step 158). The shift-in operation in steps 154, 156, 158 is repeated until zero detector 50 tells that all the bits in register 20 are 0s. These steps are the reverse of steps 112, 114, 116, and 118 shown in FIG. 5A. Output Q4 of zero detector 54 becomes 1 when the significant data of the exponent part is entirely shifted out from register 20. Therefore, the value of counter 44 is $n+1$. When output Q4 becomes 1, the output of inverter 71 for inverting the output of bit 12 is connected to the input of bit 12 via selector 54 and a write operation is performed on bit 12 by use of signal W1 so that the first bit of the last exponent part expressed in the floating-point representation of this invention which has been stored in bit 12 of register 10 is inverted. This processing is the reverse of that of step 112 shown in FIG. 5A. The last exponent part 3b according to the floating-point representation is thus set to register 10. The bit string comprising 1s or 0s in the first exponent part is created as follows. The first exponent part comprises a bit string of 1s when the sign of the numeric value x is equal to that of the exponent e. However, output Q1 of flip-flop 42 is 1 in this case as explained before, thus the bit string of 1s or 0s for the first exponent part 3a can be created only by shifting the output of flip-flop 42 to bit 12 of register 10. The number $(n+1)$ of shift-in operations is retained in counter 44. For the operation above, output Q1 of flip-flop 42 is connected to the input of bit 12 via selector 54 (step 164) so as to sequentially shift Q1 to register 10 (steps 166, 168, and 170). The counter value is thus decremented sequentially, and the shift-in operation is repeated until the counter value becomes zero.

As explained above, the exponent and mantissa parts expressed in the floating-point representation of the present invention are obtained from the fixed-length exponent part and the fixed-length mantissa part.

The present invention is not limited by the representation explained above. For example, a second representation in which E used in the preceding representation is not adopted is also possible. The second representation will be explained in the following paragraphs.

The binary representation of e can be generally given by the following expressions.

(a) When $e > 0$ $$e = [0\ 0\ \ldots\ 0\ 1\ e_n\ \ldots\ e_1] \qquad (15)$$

Where, 1 is the first significant bit and $e_n\ \ldots\ e_1$ are significant bits subsequent to the first bit.

(b) When $e < -1$ $$e = [1\ 1\ \ldots\ 1\ 0\ e_n\ \ldots\ e_1] \qquad (16)$$

Where, 0 is the first significant bit and $e_n \ldots e_1$ are significant bits subsequent to the first bit. Note that $e_n \ldots e_1$ in expressions (15) and (16) is different from $e_n \ldots e_1$ defined by expression (6) or (8).

In this embodiment, the variable-length exponent part is defined as follows.

(a) When $x \geq 0$ and $e > 0$ $$\underbrace{1 \ldots \ldots 1\ 0}_{n+2}\ e_n \ldots \ldots e_1 \quad (17)$$

(b) When $x \geq 0$ and $e < -1$ $$\underbrace{0 \ldots \ldots 0\ 1}_{n+2}\ e_n \ldots \ldots e_1 \quad (18)$$

(c) When $x < 0$ and $e > 0$ $$\underbrace{0 \ldots \ldots 0\ 1}_{n+2}\ \bar{e}_n \ldots \ldots \bar{e}_1 \quad (19)$$

(d) When $x < 0$ and $e < -1$ $$\underbrace{1 \ldots \ldots 1\ 0}_{n+2}\ \bar{e}_n \ldots \ldots \bar{e}_1 \quad (20)$$

(e) When $x > 0$ and $e = 0$ $$1\ 0 \quad (21)$$

(f) When $x < 0$ and $e = 0$ $$0\ 1 \quad (22)$$

(g) When $x \geq 0$ and $e = -1$ $$0\ 1 \quad (23)$$

(h) When $x < 0$ and $e = -1$ $$1\ 0 \quad (24)$$

Expressions (17)–(20) are of the same format as that of expressions (10)–(13) excepting that the number of bits whose value are 1s or 0s in the first exponent part is n+2.

The length of the exponent part is 2 for expressions (21)–(24), that is, the first and last exponent parts are both equal to one bit. (Compare with those of expressions (17)–(19) for details.)

To creat the fixed-length exponent part and the fixed-length mantissa part from the data listed above, the unit shown in FIG. 4 need only be modified slightly.

Explanations will be first described on the ordinary cases given by expressions (17)–(20).

As can be clear from analogous points between expressions (17)–(20) and (10)–(13), the bit length (n+2) of the first exponent part can be obtained according to the method explained in conjunction with the first representation, and the obtained value is retained in counter 44. According to the first representation, the length of the last exponent part in terms of bits is equal to that of the first part. On the other hand, according to the second representation, the length of the last exponent part is n+1 bits, that is, it is less than that of the first part by one bit. Consequently, it is only necessary to add a processing for decrementing the value of counter 44 by one before the processing (steps 114–120 is FIG. 5A) for performing a shift-in operation from register 10 to the last exponent part in register 20. The control whether the last exponent part is inverted or not at the shift-in operation is carried out in the same way as for the first representation. At completion of the shift-in operation in case of e<1, all the bits of register 20 are inverted in the same way as for the first representation. The fixed-length exponent part is thus obtained in register 20. Processing for decrementing the value of register 20 by one (step 122 in FIG. 5B) is executed after the shift in operation for the data expressed in the first representation is completed. This processing is necessary because E is utilized, that is, it is unnecessary for operating data expressed according to the second representation. The fixed-length mantissa part can be set to register 30 exactly in the same way.

Figure 7B:
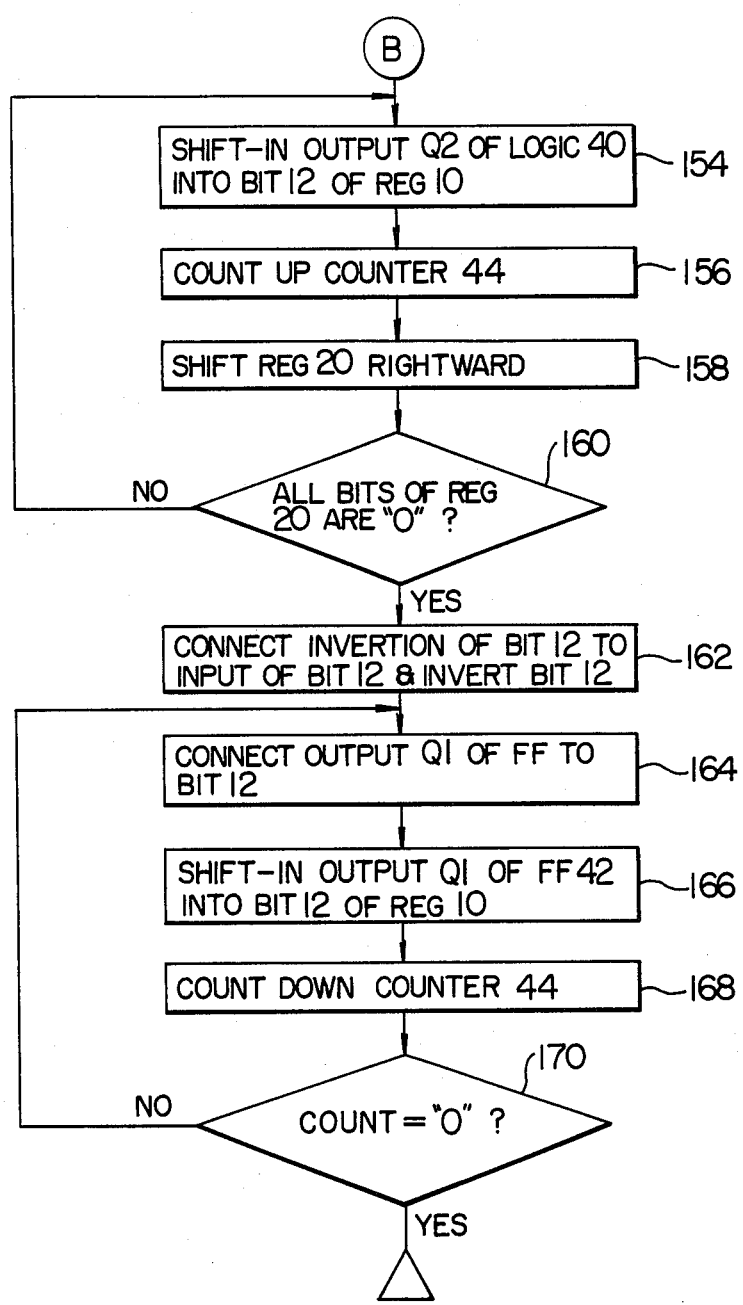
Figure 8A:
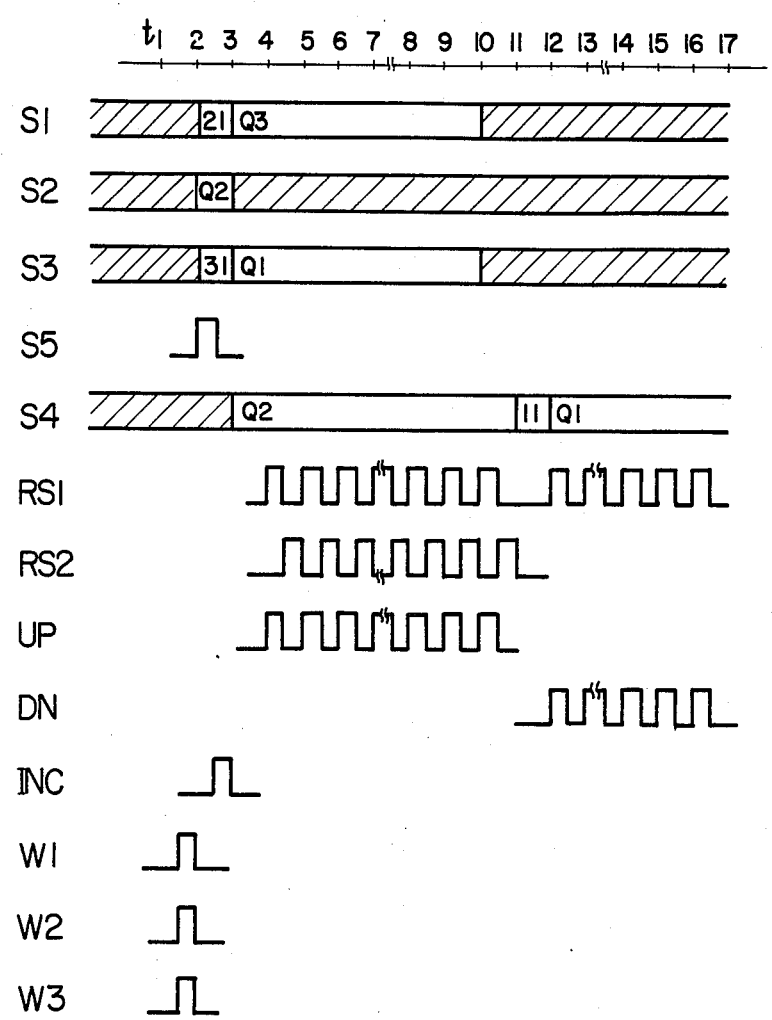
FIGS. 8A and 8B collectively show the signal timing chart for the flowchart illustrated in FIGS. 7A and 7B.
Figure 8B:
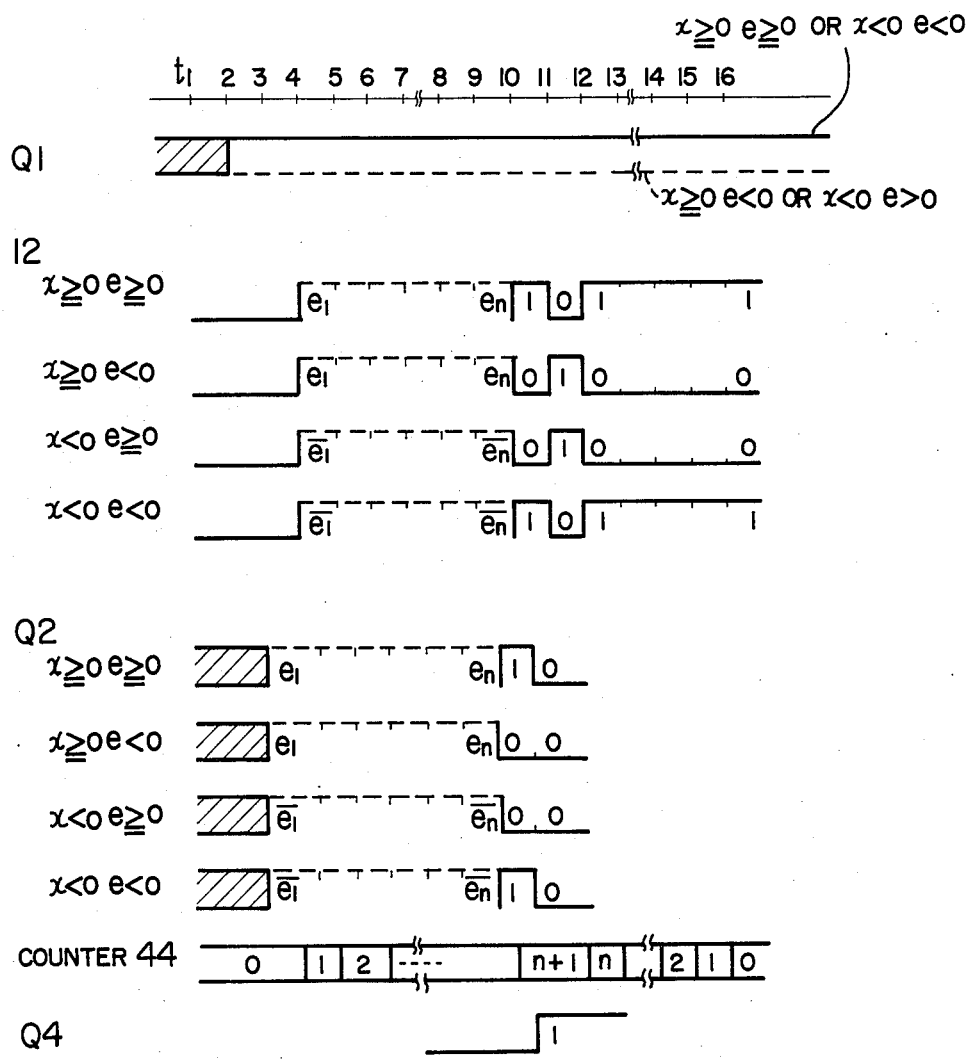

Data expressed according to the second representation can be created in register 10 from the fixed-length exponent part and the fixed-length mantissa part by reversing the pertinent processing. Difference from the operation on data expressed according to the first representation is that a processing for counting up counter 44 by one is added before the processing for performing the shift-in operation on register 10 (steps 164–170 in FIG. 7B) so that the number of bits in the bit string comprising 1s or 0s is one bit greater than that of significant bits of the exponent part in register 20, further the processing for decrementing the value of register 20 before the shift-in operation on register 10 (step 152 in FIG. 7A) is unnecessary.

The following paragraphs explain the exceptional cases given by expressions (21)–(24). The combinations of the numerical value sign.bit and the first exponent part are as follows.

0 1 0 in case of (e)
1 0 1 in case of (f)
0 0 1 in case of (g)
1 1 0 in case of (h)

For these data items, therefore, once the shift operation of the bit string comprising 0s or 1s expressed according to the first representation (steps 106–110 in FIG. 5A) is executed, output Q2 of logic circuit 40 becomes 0. This means that the control circuit (not shown) can detect the presence of these data items by judging whether the number of the shift operations carried out by the time when output Q2 becomes 0 is 1 or not. When it is found that the number of the shift operations is 1, e=0 for cases (e) and (f); therefore, the content of register 20 need not be changed; further, e=−1=[1 1 ... 1]$_2$ for cases (g) and (h), so it is only necessary to invert all the bits of register 20. That is, the shift-in processing (steps 112–122 in FIG. 5A) provided for the first representation is unnecessary and control can be passed immediately to step 124 (FIG. 5B). Then, the contents of register 20 are inverted (step 128 in FIG. 5B) in case of e=−1; no action is taken in case of e=0. The fixed-length exponent part is thus completely created. The fixed-length mantissa part is created exactly in the same way as for the conventional representation (step 130 in FIG. 5B).

Moreover, the data expressed in the second representation can be created in case of e=0 or e=−1 by executing the processing listed in FIG. 7A excepting steps 152 and 162.

I claim:

1. A floating-point data operating unit comprising:
   a first register for storing data expressed according to a floating-point representation having a variable-length exponent part;
   a second register for storing data of a fixed-length exponent part;
   a third register for storing data of a fixed-length mantissa part;
   means connected to said first register for detecting the length of a string comprising 0s or 1s in a first part of said variable-length exponent part to establish the boundary between said variable-length exponent part and a mantissa part following said variable-length exponent part;
   means connected to said first register and said detecting means for transferring bits, forming a second part of said variable-length exponent part succeeding said first part and having a length dependent upon said detected length, from said first register to said second register; and
   means connected to said first register and said detecting means for transferring data which remains in said first register, following said bit transfer from said first register to said second register, to a third register, whereby the data in said first register is subdivided into an exponent part and a mantissa part.

2. A floating-point data operating unit according to claim 1 wherein said means for detecting the length of a string comprising 0s or 1s is said variable-length exponent part operates to detect a floating-point representation in which the first part of said variable-length exponent part comprises a bit string consisting of 0s followed by a bit of 1 or a bit string consisting of 1s followed by a bit of 0 to establish the boundary between the variable-length exponent part and the mantissa part followin said variable-length exponent part, and the length of said first part of said exponent part determines the total length of said exponent part.

3. A floating point operation unit according to claim 2, wherein said detecting means inc16des means for sequentially counting the total number of 0s or 1s within the string comprising 0s or 1s in the first part of said variable length exponent part so as to detect the length of the string.

4. A floating-point data operating unit comprising:
   a first register for storing data expressed according to a floating-point representation having a variable-length exponent part;
   a second register for storing data of a fixed-length exponent part;
   a third register for storing data of a fixed-length mantissa part;
   means connected to said second and third registers for selecting a bit string consisting of 0s or a bit string consisting of 1s in a first part of said second register for detecting the length of said selected bit string, and for transferring sata from said second register to said first register depending on the value of a sign bit of said third register; and
   means connected to said third register for transferring data from: said third register to said first register, whereby the exponent part in said second register and the mantissa part in said third register are combined and are converted into a value expressed according to a floating-point representation having a variable-length exponent part by use of said first register.

5. A floating-point operating unit according to claim 4, wherein a first part of said variable-length exponent part comprises a bit string consisting of 0s followed by a bit of 1 or a bit string consisting of 1s followed by a bit of 0 to establish the boundary between the variable-length exponent part and the mantissa part following said variable-length exponent part, and the length of a second part of said variable-length exponent part determines the total length of said variable-length exponent part.

6. A floating point operation unit according to claim 5, wherein said detecting means includes means for sequentially counting the total number of 0s or 1s within the string comprising 0s or 1s in the first part of said second register so as to detect the length of the string.

7. An operation unit for floating point data comprised of a variable-length exponent part indicative of an exponent of a number and a variable-length mantissa part indicative of a mantissa of the number, the exponent part including a preceding first bit portion of all "1" or all "0" and a succeeding second bit portion indicative of a value of the exponent of the number, the bit length of the preceding first bit portion depending upon a value of the exponent of the number, the bit length of the succeeding second bit portion depending upon the bit length of the preceding first bit portion, comprising:
   first means for responding to all 1 or all 0 included in the preceding first bit portion of the exponent part of the floating point data and for separating the succeeding second bit portion of exponent part and the mantissa part based upon the bit length of the all 1 or all 0 part of the preceding first bit portion; and
   second means connected to said first means for performing an arithmetic operation on the separated succeeding second bit portion of the exponent part and the separated mantissa part.

8. An operation unit according to claim 7, wherein said first means includes means for converting the succeeding second bit portion of the exponent part and the mantissa part into exponent data of fixed length and mantissa data of fixed length, respectively and for providing the exponent data and the mantissa data to said second means.

9. An operation unit according to claim 8,
   wherein said floating point data further includes a sign bit indicative of a sign of the number;
   wherein the conversion from the exponent part to the exponent data by said first means depends upon the sign bit of the floating point data and the starting bit of the preceding first bit portion of the exponent part and the bit length of the preceding first bit portion of the exponent part.

10. An operation unit according to claim 9,
    wherein the exponent data comprises a preceding first bit portion of all 1 or all 0 and a succeeding second bit portion of significant bits indicative of the value of the exponent of the number, the starting bit of the preceding first bit portion being a sign bit indicaiive of a sign of the exponent;
    wherein the mantissa data includes a sign bit indicative of a sign of the mantissa of the number and a succeeding significant-bit portion indicative of the value of the mantissa of the number;
    wherein said converting means includes means for generating the preceding first bit portion of all 1 or all 0 of the exponent data based upon the sign bit of the floating point data and the starting bit of the preceding first bit portion of the exponent part, for generating the succeeding second bit portion of the exponent data based upon the sign bit of the floating point data, the starting bit of the preceding first bit portion of the exponent part and the succeeding second bit portion of the exponent part, for providing the sign bit of the floating point data as the sign bit of the mantissa data and for generating the significant-bit portion of the mantissa data based upon the mantissa part of the floating point data, both the bit length of the preceding first bit portion of the exponent data and the bit length of the succeeding second bit portion of the exponent data depending upon the bit length of the preceding first bit portion of the exponent part of the floating point data.

11. An operation unit comprising:

first means for performing an arithmetic operation on input data and providing exponent data of fixed length and mantissa data of fixed length as a result of the operation;

second means connected to said first means for converting the exponent data and the mantissa data respectively into an exponent part of variable length and a mantissa part of variable length both of floating point data;

the exponent part including a preceding bit portion of all 1 or all 0 and a succeeding bit portion indicative of a value of an exponent represented by the exponent data, the bit length of the preceding bit portion depending upon the value of the exponent, the bit length of the succeeding bit portion depending upon the bit length of the preceding bit portion, the mantissa part of the floating point data including bits indicative of a value of a mantissa repersented by the mantissa data and the bit length of the mantissa part depending upon the bit length of the exponent part.

12. An operation unit according to claim 11, wherein the exponent data includes a preceding bit portion of bits of all 1 or all 0 and a succeeding bit portion of significant bits indicative of the value of the exponent, the starting bit of the preceding bit portion being a sign bit indicative of a sign of the exponent; and wherein the mantissa data includes a sign bit indicative of a sign of the mantissa and a succeeding significant-bit portion indicative of the value of the mantissa;

wherein the conversion from the exponent data to the exponent part by said second means depends upon the sign bit of the exponent data, the sign bit of the mantissa data and the bit length of the preceding bit portion of the exponent data, 13. An operation unit according to claim 12, wherein said converting means includes means for generating the preceding bit portion of all 0 or all 1 of the exponent part of the floating point data based upon the sign bit of the exponent data and the sign bit of the mantissa data, for generating the succeeding bit portion of the exponent part of the floating point data based upon the sign bit of the exponent data, the sign bit of the mantissa data and the succeeding bit portion of the exponent data, for generating the mantissa part of the floating point data based upon the significant-bit portion of the mantissa data, and for providing the signa bit of the mantissa data as a sign bit indcative of a sign of the number and to be added to the floating point data, both the bit length of the preceding bit portion of the exponent part of the floating point data and the bit length of the succeeding bit portion of the exponent part of the floating point data depending upon the bit length of the preceding bit portion of the exponent data, and the bit length of the mantissa part of the floating point data depending upon the bit length of the exponent part of the floating point data.

14. An operation unit for floating point data having a representation according to which floating point data is comprised of a variable-length exponent part indicative of an exponent of a number of a variable-length mantissa part indicative of a mantissa and the number, the exponent part including a preceding bit portion of all 1 or all 0 and a succeeding bit portion indicative of a value of the exponent, the bit length of thepreceding bit portion of the floating point data depending upon a value of the exponent of the number, and the bit length of the succeeding bit portion of the exponent part of the floating point data depending upon the bit length of the preceding bit portion of the exponent part of the floating point data, comprising:

first means for responding to all 1 or all 0 included in the preceding bit portion of the exponent part of floating point data of the representation and for separating the succeeding bit portion of the exponent part and the mantissa part based upon the bit length of the all 1 or all 0 part and for converting the succeeding bit portion of the exponent part and the mantissa part into first exponent data of fixed length and first mantissa data of fixed length, respectively; and second means connected to said first means for performing a floating point operation on the first exponent data and the first mantissa data and for providing second exponent data and second mantissa data as a result of the operation; and third means connected to said second means for converting the second exponent data and the second mantissa data into floating data of the representation.

15. An operation unit for floating point data of a repersentation according to which floating point data is comprised of a variable-length exponent part indicative of an exponent of a number and a variable-length mantissa part indicative of a mantissa of the number, the exponent part including a preceding bit portion of all "1" or all "0" and a succeeding bit portion indicative of a value of the exponent of the number, the length of the preceding bit portion depending upon a value of the exponent of the number, the bit length of the succeeding bit portion depending upon the bit length of the preceding bit portion, comprising:

first means for holding the floating point data;

second means connected to said first means for performing an arithmetic operation on the floating point data and for providing floating point data corresponding to the result of the operation and represented according to the representation.

* * * * *